United States Patent
Roisman et al.

(10) Patent No.: US 11,366,573 B2
(45) Date of Patent: Jun. 21, 2022

(54) AUTOMATIC DEVELOPMENT OF A SERVICE-SPECIFIC CHATBOT

(71) Applicant: SAP Portals Israel Ltd., Ra'anana (IL)

(72) Inventors: Pablo Roisman, Hod Hasharon (IL); Itai Fonio, Tel Aviv (IL); Yaron Livneh, Binyamina (IL); Ari Lulu, Rosh Haayin (IL)

(73) Assignee: SAP Portals Israel Ltd., Ra'anana (IL)

( * ) Notice: Subject to any disclaimer, the term of this patent is extended or adjusted under 35 U.S.C. 154(b) by 40 days.

(21) Appl. No.: 16/186,181

(22) Filed: Nov. 9, 2018

(65) Prior Publication Data

US 2020/0150839 A1    May 14, 2020

(51) Int. Cl.
| | |
|---|---|
| G06F 3/0484 | (2022.01) |
| G06F 16/182 | (2019.01) |
| H04L 51/02 | (2022.01) |
| H04L 67/01 | (2022.01) |

(52) U.S. Cl.
CPC .......... *G06F 3/0484* (2013.01); *G06F 16/183* (2019.01); *H04L 51/02* (2013.01); *H04L 67/42* (2013.01)

(58) Field of Classification Search
CPC ..... G06F 3/0484; G06F 16/183; H04L 51/02; H04L 67/42
See application file for complete search history.

(56) References Cited

U.S. PATENT DOCUMENTS

| | | | |
|---|---|---|---|
| 6,311,165 B1 | 10/2001 | Coutts et al. | |
| 6,327,700 B1 | 12/2001 | Chen et al. | |
| 6,725,122 B2 | 4/2004 | Mori et al. | |
| 7,020,594 B1 | 3/2006 | Chacon | |
| 7,406,358 B2 | 7/2008 | Preiss | |
| 7,536,697 B2 | 5/2009 | Wiseman et al. | |
| 7,617,328 B2 | 11/2009 | Lewis et al. | |
| 7,895,209 B2 | 2/2011 | Spence et al. | |
| 7,941,236 B2 | 5/2011 | Spearman | |
| 2002/0072988 A1 | 6/2002 | Aram | |
| 2002/0099634 A1 | 7/2002 | Coutts et al. | |
| 2003/0120665 A1 | 6/2003 | Fox et al. | |
| 2003/0216978 A1 | 11/2003 | Sweeney et al. | |
| 2003/0229522 A1 | 12/2003 | Thompson et al. | |
| 2003/0229550 A1 | 12/2003 | DiPrima et al. | |
| 2004/0015366 A1 | 1/2004 | Wiseman et al. | |
| 2004/0083233 A1 | 4/2004 | Willoughby | |
| 2004/0133445 A1 | 7/2004 | Rajan et al. | |
| 2004/0148227 A1 | 7/2004 | Tabuchi et al. | |
| 2004/0187140 A1 | 9/2004 | Aigner et al. | |

(Continued)

*Primary Examiner* — Stephen S Hong
*Assistant Examiner* — Nicholas Hasty
(74) *Attorney, Agent, or Firm* — Fish & Richardson P.C.

(57) ABSTRACT

A service descriptor file is retrieved from a remote database by a server, where the service descriptor file describes a service corresponding to a service-specific chatbot requested by a user. The received service descriptor is parsed to obtain a capability and relevant service data associated with the service. The service-specific chatbot is generated with at least one object that is based on the obtained capability and relevant service data, where the at least one object includes intents, expressions, and skills that correspond to the service. The generated service-specific chatbot is provided to the user through at least one channel to enable an interaction with the service-specific chatbot with a graphical user interface.

20 Claims, 6 Drawing Sheets

(56) References Cited

U.S. PATENT DOCUMENTS

| | | |
|---|---|---|
| 2005/0209732 A1 | 9/2005 | Audimoolam et al. |
| 2005/0216421 A1 | 9/2005 | Barry et al. |
| 2005/0228821 A1 | 10/2005 | Gold |
| 2006/0026552 A1 | 2/2006 | Mazzitelli et al. |
| 2006/0036941 A1 | 2/2006 | Neil |
| 2007/0055688 A1 | 3/2007 | Blattner |
| 2007/0112574 A1 | 5/2007 | Greene |
| 2007/0132585 A1 | 6/2007 | Llorca et al. |
| 2007/0156545 A1 | 7/2007 | Lin |
| 2007/0156552 A1 | 7/2007 | Manganiello |
| 2008/0184265 A1 | 7/2008 | Kasi et al. |
| 2008/0288317 A1 | 11/2008 | Kakar |
| 2009/0006203 A1 | 1/2009 | Fordyce et al. |
| 2009/0164497 A1 | 6/2009 | Steinmaier et al. |
| 2009/0193432 A1 | 7/2009 | McKegney et al. |
| 2009/0300578 A1 | 12/2009 | Neil |
| 2010/0070391 A1 | 3/2010 | Storr et al. |
| 2010/0161425 A1 | 6/2010 | Sideman |
| 2011/0046775 A1 | 2/2011 | Bailey et al. |
| 2018/0121403 A1 | 5/2018 | Nirit-Cohen-Zur |
| 2019/0132264 A1* | 5/2019 | Jafar Ali ................. G06F 40/30 |
| 2019/0171758 A1* | 6/2019 | Pinel ....................... G06N 3/006 |
| 2019/0228068 A1* | 7/2019 | Sen .......................... G06F 40/30 |
| 2019/0347142 A1* | 11/2019 | Yaramada ............ G06F 9/44505 |
| 2019/0392285 A1* | 12/2019 | Manaharlal Kakkad .................... G06F 40/30 |

\* cited by examiner

AUTOMATIC DEVELOPMENT OF A SERVICE-SPECIFIC CHATBOT

BACKGROUND

Internet protocol (IP) allows the creation and consumption of various application programming interfaces (APIs) in a simple and standard way. An end-user can interact with IP (or other networking protocols) using dedicated chatbots, which are computer programs, possibly containing artificial intelligence (AI) or machine-leading that can perform conversational-type functions (for example, using text or auditory methods). In some cases, chatbots are also known as chat robots, interactive agents, conversational interfaces, smartbots, talkbots, chatterbots, or artificial conversational entities). Developing a dedicated chatbot (that is, to perform a specific service) requires resources and time even when using a conventional chatbot development platform. Additionally, conventional development of a chatbot also requires developers to maintain and manually adopt changes in underlying service(s) provided by the chatbot.

SUMMARY

The present disclosure describes methods and systems, including computer-implemented methods, computer program products, and computer systems for automatically developing service-specific chatbots.

In an implementation, A service descriptor file is retrieved from a remote database by a server which described in the service descriptor file corresponds to a service-specific chatbot requested by a user. The received service descriptor is parsed to obtain a capability and relevant service data associated with the service. The service-specific chatbot is generated with at least one object that is based on the obtained capability and relevant service data, wherein the at least one object includes intents, expressions, and skills that correspond to the service. The generated service-specific chatbot is provided to the user through at least one channel to enable an interaction with the service-specific chatbot with a graphical user interface.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, the described subject matter to automatically generate chatbots can improve overall software development of chatbots; specifically, by improving user interfaces which can reduce chatbot development efforts for large computing systems. For example, the large computing systems may contain hundreds of different available services, and configuring one or more chatbots to use the available services can be a daunting task using conventional software development means. Further, generated chatbots can be used to improve cloud-computing technologies by permitting faster and more efficient generation of user interfaces for cloud-computing environments. Additionally, the generated chatbots can permit increased overall availability to associated computing systems through advanced conversational graphical user interface (GUI) technology as compared to conventional chatbots. Chatbots can also be generated for multiple languages (for example, based on user requirements and geographical considerations). Since the chatbots are generated according to a particular service, the chatbot can automatically regenerate and adapt to any changes to the particular service.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
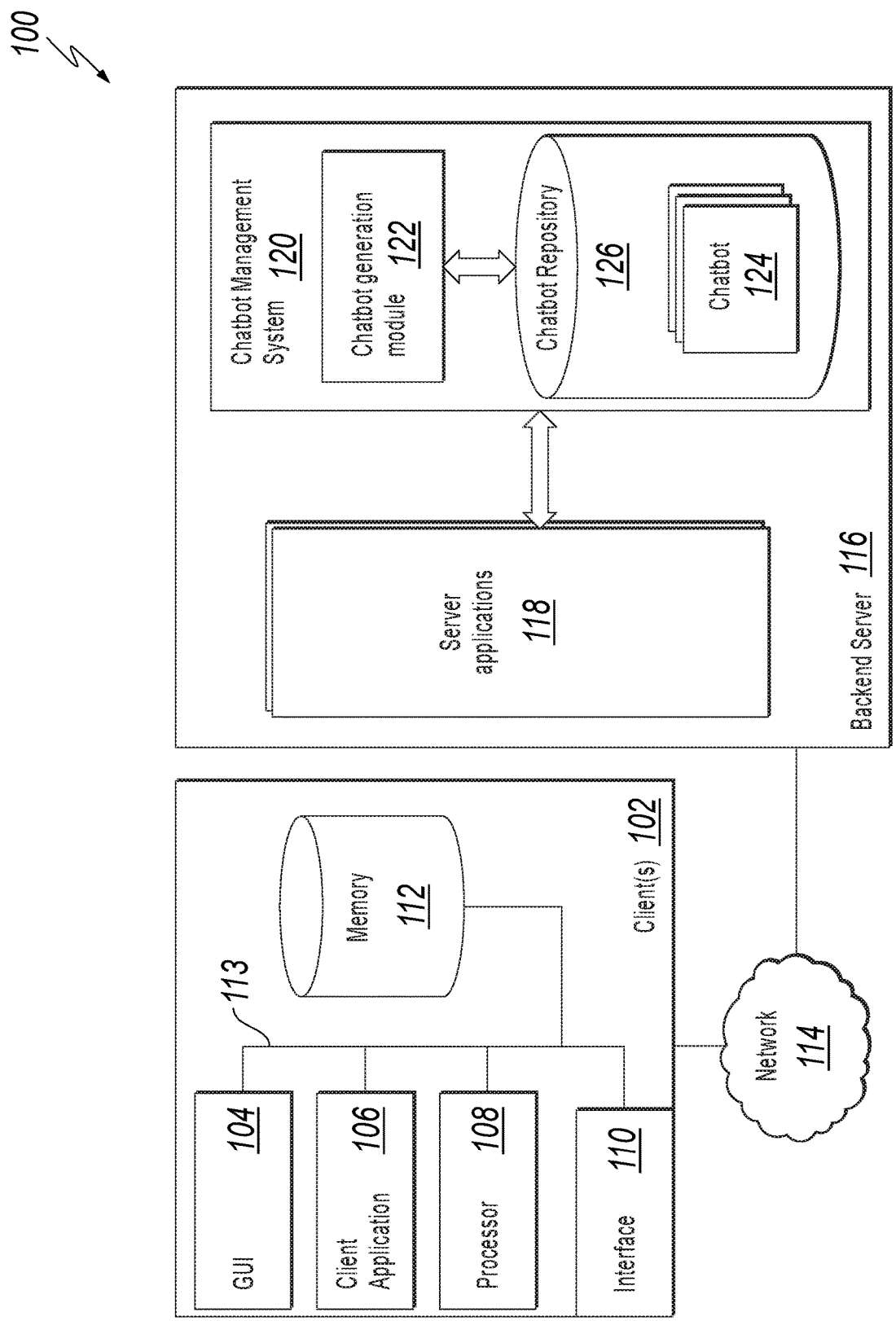
FIG. 1 is a block diagram illustrating an example computing system for executing a client request for creating a service-specific chatbot, according to an implementation of the present disclosure.

The following detailed description describes automatically generating service-specific chatbots and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

A chatbot can simulate human conversation, or chatting, through artificial intelligence, machine-learning, or other types of computer programs. In some implementations, chatbots permit highly-engaging, conversational experiences through voice and text that can be customized for use on chat platforms (such as, mobile devices or web browsers executing software applications, and including, but not limited to, FACEBOOK MESSENGER, SLACK, or WECHAT). With the advent of deep/machine-learning technologies (such as text-to-speech, automatic speech recognition, and natural language processing), chatbots that simulate human conversation and dialogue can be leveraged in call center and customer service workflows, DEVOPS management, and as personal assistants.

Different business rules for use with chatbots can be generated (for example, based on government regulations, industry standards, or policies of an individual enterprise). As a particular example, a hotel may set forth rules for operations that relate to hotel room reservations (such as, making a new hotel room reservation or canceling an existing hotel room reservation). In some cases, business rules transmitted through networks are required to conform to one or more web protocols. For example, Open Data Protocol (OData) is a web protocol for querying and updating data over a network. OData permits a user to request data from a data source using the Hypertext Transfer Protocol (HTTP) and to receive results from the data source in various formats (such as, ATOM PUBLISHING PROTOCOL (ATOM), JAVASCRIPT OBJECT NOTATION (JSON), or EXTENSIBLE MARKUP LANGUAGE (XML)). OData is increasingly used by various computing platforms, such as mobile devices and desktop computers, and is becoming an important method of accessing information over networks. Internet protocols such as OData, allow the creation and consumption of Representational state transfer (REST)ful application programming interfaces (APIs) in a simple and standard way, for example, through dedicated chatbots. As in the prior example, a user may wish to generate a new hotel room reservation or to cancel an existing hotel room reservation through interaction with a customer service chatbot, which can reduce overall costs required if actual human interventions are used.

However, developing dedicated chatbots usually requires resources and time even when using conventional chatbot development platforms (such as, SAP RECAST.AI or other chatbot development platforms). Further, maintenance and adoption of changes in underlying REST services associated with of developed chatbots also requires great expenditure of development resources. For example, in some computing platforms, there can be an ever-increasing number of available applications. If all of the available applications are based on OData, it can take about one day to generate a chatbot for each OData-based service. That is, in this example, creating a chatbot for each available application could take approximately 1,000 days.

To solve these problems, this disclosure describes a method of automatically generating service-specific chatbots based on a service descriptor file associated with a particular service. The proposed solution includes parsing the service descriptor file and generating a service-specific chatbot with chatbot-relevant objects (such as Intents, expressions, Skills, and channel connectors) based on the service descriptor file. The described method permits development of service-specific chatbots in a simple and efficient manner. Moreover, since a service-specific chatbot is generated according to the service descriptor, the service-specific chatbot can be configured to automatically adopt service-associated changes without the need to regenerate a new service-specific chatbot in response to the service-associated changes.

Specifically, the proposed method can be used to reduce software/computing system development efforts through generation of a service-specific chatbot that can be accessed through a graphic user interface (GUI) that provides advanced rendering capabilities and built-in logic. In some implementations, all service-specific chatbot-associated entities can be extracted from a service metadata descriptor file (such as, a descriptor file used in OData services). Fortunately, OData exposes a service document (that is, a service descriptor file) that lists all top-level data feeds, which can be used by clients to discover data feeds and addresses of the data feeds. The exposed service descriptor file can also describe entities, properties, and relationships and be used to describe message exchange between a web server (or other data) provider and a user.

The service descriptor file is typically available at a Service Root uniform resource identifier/locator (URI/L). In some implementations, the service descriptor file may be JSON-formatted. Typically, an OData request can be provided as a URL that includes one or more of various supported OData options, but, in other implementations, OData requests can also be structured in other appropriate formats. When a user wishes to obtain information for a particular service, the user can transmit a request so that a chatbot development system will retrieve the service descriptor file by visiting the network address associated with the URL contained in the request. Once the service descriptor file is found, the chatbot development platform returns the service descriptor file, which contains information about the particular service. In some cases, a metadata file that contains metadata information associated with the service descriptor file can be further processed to extract service metadata from the service descriptor file.

Using the disclosed approach, users can generate service-specific chatbots based on the requested service and interact with the generated chatbots to fulfil different requests. For example, a user can generate a new service-specific chatbot on the chatbot development platform by selecting a new service name, such as "leave request." The chatbot development platform then calls for a service descriptor file containing data associated with creation of a leave request in the enterprise computing system the user is associated with, and automatically generates a service-specific chatbot based on the content of the service descriptor file. Once the service-specific chatbot is generated, the user can go to an account associated with the chatbot development platform and interact with the service-specific chatbot. For example, typing the request, "I want to create a leave request". The service-specific chatbot may ask a few questions (as "expressions" described in more detail below), such as a desired start/end date of the leave and an employment ID. Afterwards, the service-specific chatbot can generate the leave request with obtained data. In this way, the disclosed approach can quickly generate chatbots to enable fast go-to-market (GTM) results by leveraging existing applications. The generated service-specific chatbots can be fully integrated with different application integrated development environments (IDEs), provide multi-language support, and provide automatic updates.

FIG. 1 is a block diagram illustrating an example computing system 100 for executing a client request for creating a service-specific chatbot, according to an implementation of the present disclosure. In some implementations, the system 100 includes, or is communicably coupled with, a backend server 116, one or more clients 102, and a network 114 connecting the backend server 116 and the one or more clients 102. In some implementations, one or more components of the system 100 may be configured to operate as part of a cloud-based computing environment.

A client 102 may be any computing device operable to connect to or communicate with at least the backend server 116. In some implementations, the client 102 includes an electronic computing device operable to receive, transmit, process, and store any appropriate data associated with the system 100. Among other things, the client 102 can send a request for creating a service-specific chatbot to the backend server 116 for processing by one or more server applications 118. The client 102 typically includes a GUI 104, a processor 108, a client application 106, a memory 112, and an interface 110 communicating over a system bus 113.

In some implementations, the client application 106 can use parameters, metadata, and other information received at launch to access a particular set of data from the backend server 116. Once a particular client application 106 is launched, a user may interactively process a task, event, or other information associated with the backend server 116. For example, the client application 106 can generate and transmit a particular message (for example, a request for creating a new chatbot for a specific service) to the backend server 116. In some implementations, the message can be sent to the backend server 116 by a user typing a text-type entry using GUI 104 generated by client application 106 (for example, by typing a new request or selecting from a list of existing requests on the GUI 104). The client application 106 executes a request received from the GUI 104 (for example, by clicking a "generate" button) and communicates the request to the backend server 116 using the network 114 (for example, using the OData web protocol). The client application 106 also allows the client to navigate to/from, request, view, create, edit, delete, administer, or manipulate content associated with the backend server 116. For example, the client application 106 can present the generated service-specific chatbot to a user, which is generated/transmitted by the backend server 116 through the GUI 104.

The GUI 104 can be configured for different representations based on a particular service request. In some implementations, each GUI representation can be associated with a particular service (for example, a service for a hotel business. In some implementations, a machine-learning process or AI methods can be implemented, at least in part, using one or more processing devices of the client 102 to process received user requests. In this way, user requests that are not made in a formal language style can also be understood and processed by the client application 106.

The backend sever 116 can include one or more server applications 118 and a chatbot management system 120. The chatbot management system can includes a chatbot generation module 122 and a chatbot repository 126.

At a high-level, the backend server 116 is an electronic computing device operable to receive, transmit, process, store, or manage data and information associated with the system 100. In some implementations, the backend server 116 may also include, or be communicably coupled with, an e-mail server, a web server, a caching server, a streaming data server, a business intelligence (BI) server, or other server. The backend server 116 is responsible for receiving, among other things, requests or content from one or more client applications 106 associated with the client 102 of the system 100 through the network 114.

Once a request (for example, a user request) reaches the backend server 116, the request is processed by the server application 118. In some implementations, the chatbot generation module 122 of the chatbot management system 120 can be used to retrieve, read, and analyze a service descriptor file from a remote database/web location. The service descriptor file can be parsed to extract capabilities and data associated with a user-requested service. The chatbot generation module 122 can understand the capabilities from the parsed service descriptor file and translate the capabilities to a corresponding service-specific chatbot technology architecture, such as intent, expressions, skills, and other building blocks that make-up a chatbot. Once the chatbot generation module 122 has extracted all the relevant information from the service descriptor file, it can generate a chatbot that is specifically tailored for the service/capability described in the service descriptor file.

In some implementations, the generated service-specific chatbot can be stored in a chatbot repository 126 as a chatbot 124. In some implementations, the chatbot repository 126 can be a cloud-computing environment from where users can retrieve generated service-specific chatbots based on a desired/required service. Because the service-specific chatbots are generated according to the service descriptor file, a new service-specific chatbot can be automatically generated by updating the service descriptor file when a change occurs to an associated service. For example, after a user generates a service-specific chatbot for a service of "make a hotel room reservation", a new service-specific chatbot can be generated for a service of "cancel a hotel room reservation", by updating the service descriptor file of the service for "make hotel room reservation." As such, the service-specific chatbot can be automatically updated to adopt and to perform the changes reflected in the updated service descriptor file.

Figure 2:
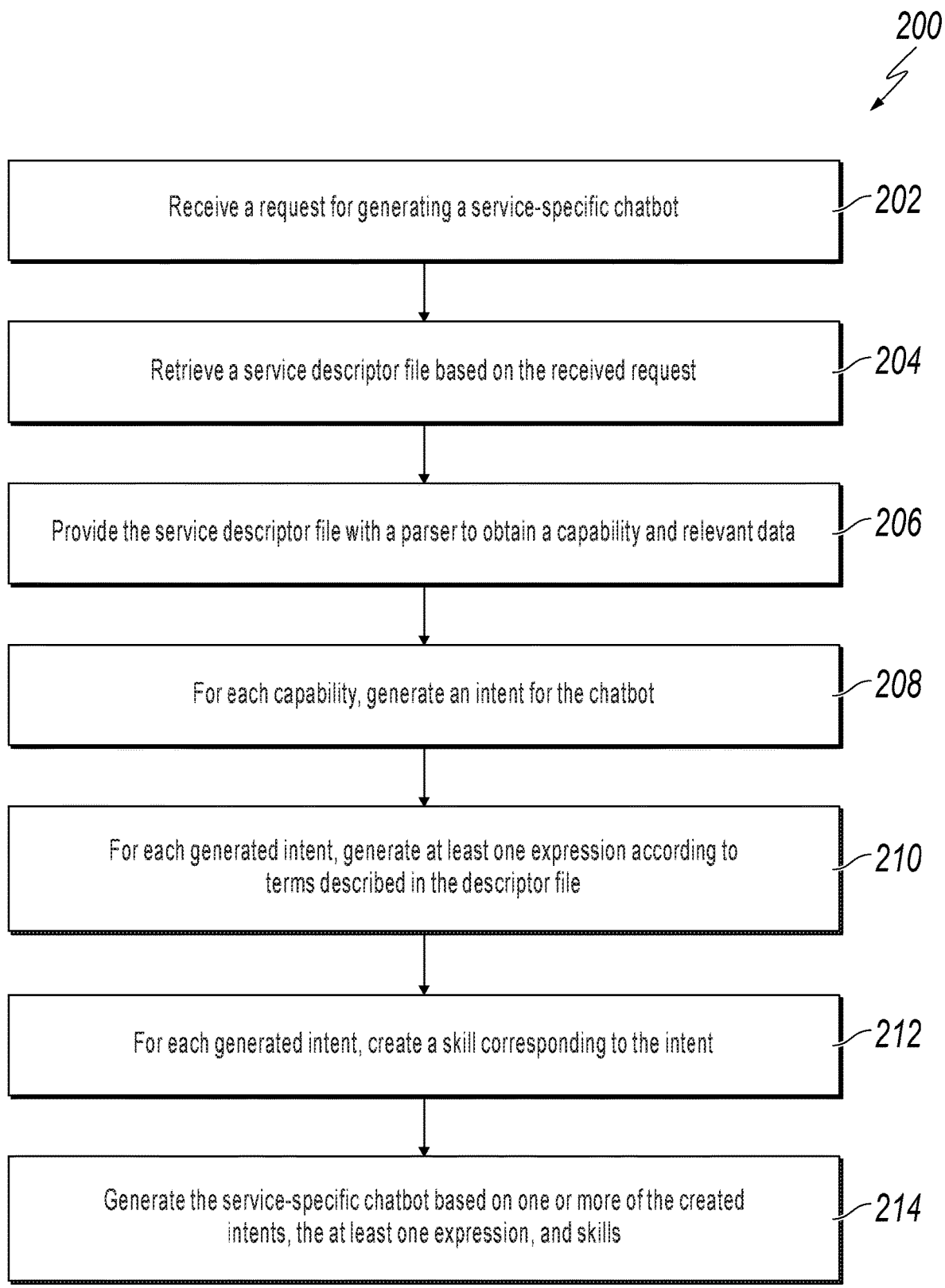
FIG. 2 is a flowchart illustrating an example of a computer-implemented method for automatically generating a service-specific chatbot, according to an implementation of the present disclosure.

FIG. 2 is a flowchart illustrating an example of a computer-implemented method 200 for generating a service-specific chatbot, according to an implementation of the present disclosure. For clarity of presentation, the method 200 will be described at least by FIG. 2 in conjunction with FIG. 3. Other figures may also be applicable in describing one or more aspect of method 200. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

Figure 3A:
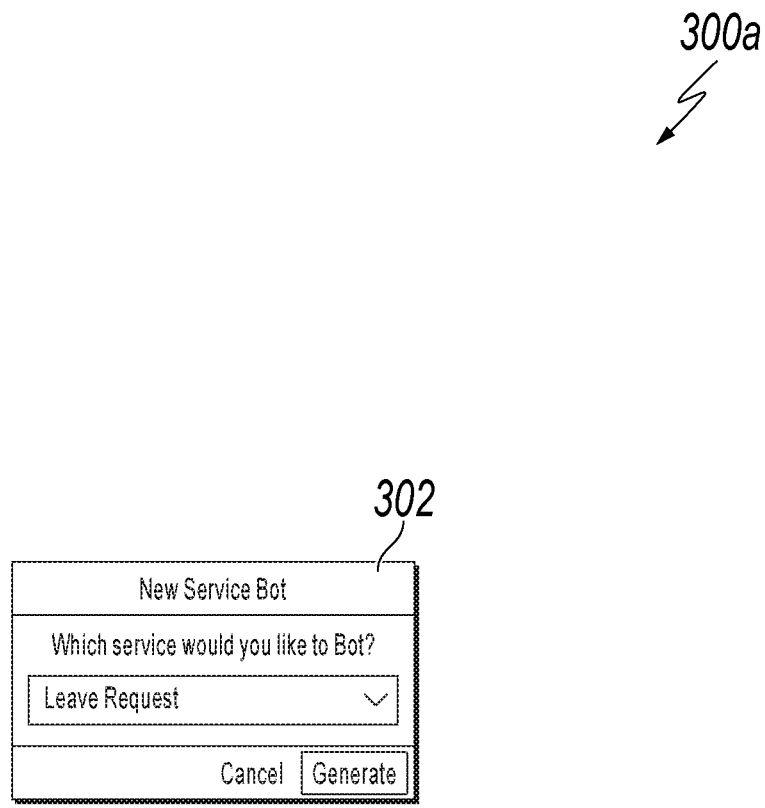
FIG. 3A is an illustration of an example graphical user interface (GUI) used in a process for transmitting a request to a computing system to generate a chatbot using a chatbot development platform, according to an implementation of the present disclosure.

At 202, a request (for example, a user request) for generating a service-specific chatbot is received (for example, from a client application 106 executing on a client 102 as previously described in FIG. 1). In some implementations, such request can be received by a user typing a request into a GUI or selecting a service from a list of existing services. Referring to FIG. 3A, FIG. 3A is an illustration of an example GUI 300a used in a process for transmitting a request to a computing system to generate a chatbot using a chatbot development platform, according to an implementation of the present disclosure. In this example, the SAP RECAST.AI platform is used and illustrated as the chatbot development platform. As shown in FIG. 3A, a user who wishes to generate a chatbot to process a leave request service (such as, for an employee vacation/leave) can select an appropriate service from a pulldown menu in a dialog 302 of the development platform. Returning to FIG. 2, after 202, method 200 proceeds to 204.

At 204, a service descriptor file is received by the system 100 based on the received request. After 204, method 200 proceeds to 206.

At 206, the service descriptor file is parsed to obtain a capability and relevant data associated with the selected service. A capability can be considered to be a query or action associated with the service (for example, "show total amount of sales orders created yesterday" or "create leave request between tomorrow and november 2018"). In some implementations, the service descriptor file can be parsed to generate a particular vocabulary object in a required data structure. In such implementations, extracted metadata can be mapped to a particular vocabulary. The particular vocabulary can be parsed (for example, with a business language parser) to generate a service-specific business language. Capabilities and data associated with the service can be extracted from the service-specific business language and translated into various chatbot architectures. After 206, method 200 proceeds to 208.

At 208, for each capability described in the service descriptor file, an intent for the service-specific chatbot is generated. The intent provides a context of the service and is the heart of a service-specific chatbot's understanding. That is, each intent represents an idea the service-specific chatbot is required to understand. For example, if a user wants to generate a service-specific chatbot to understand when someone is asking for help, the user can generate an intent named "help". After 208, method 200 proceeds to 210.

At 210, for each generated intent, at least one expression is generated according to terms described in the service descriptor file. In some implementations, the terms can be descriptions of the capability. An expression is a sentence that the service-specific chatbot can understand. In other words, it can represent a user's input when interacting with the service-specific chatbot. Expressions are organized in intents and constitute the entire knowledge of the service-specific chatbot. The more expressions that are generated, the more precisely the service-specific chatbot will be able to understand associated users. For example, in the previous example, after the user generates the intent for "help", the user can associate the intent with a multitude of possible expression a user might enter when asking for help/guidance. Examples can include, "Can you help me", "I am lost, give me a hand please", "can you help", and "What can you do for me".

In some implementations, a keyword can be extracted from an expression as an entity. For example, a service can be "create a leave request for tomorrow", the extracted keyword can be "create", the affected object is leave request, and the input parameter is the appropriate date of the following day (that is, tomorrow). After 210, method 200 proceeds to 212.

At 212, for each generated intent, a skill corresponding to the intent is generated. Actions associated with the skill and required data is extracted from the service descriptor file. A skill can be considered to be a conversational block that has a clear purpose that the service-specific chatbot can execute to achieve a goal. It can be as simple as the ability to greet someone, but it can also be more complex, such as providing movie suggestions based on information provided by the user.

In some implementations, a skill can be formed of three distinct parts: 1) triggers, which are conditioned to determine if the skill should or should not be activated; 2) requirements that determine the information the chatbot needs to retrieve from the users and the manner of retrieving it; and 3) actions, which are performed by the service-specific chatbot when the requirements are satisfied (for example, an action can be to expect an API call). After 212, method 200 proceeds to 214.

Figure 3B:
FIG. 3B is a screenshot illustrating an example GUI for a service-specific chatbot generated by the disclosed method, according to an implementation of the present disclosure.

At 214, a service-specific chatbot is generated (for example, using a chatbot development service API) based on the generated intent, one or more expressions, and skills. A user can interact with the generated chatbot through an application UI (for example, as shown in FIG. 3B). Turning to FIG. 3B, FIG. 3B is a screenshot illustrating an example GUI 300b for a service-specific chatbot generated by the disclosed method, according to an implementation of the present disclosure. As shown in FIG. 3B, a user can make a leave request using the generated leave request chatbot 304. Returning to FIG. 2, after 214, method 200 can stop.

Figure 4:
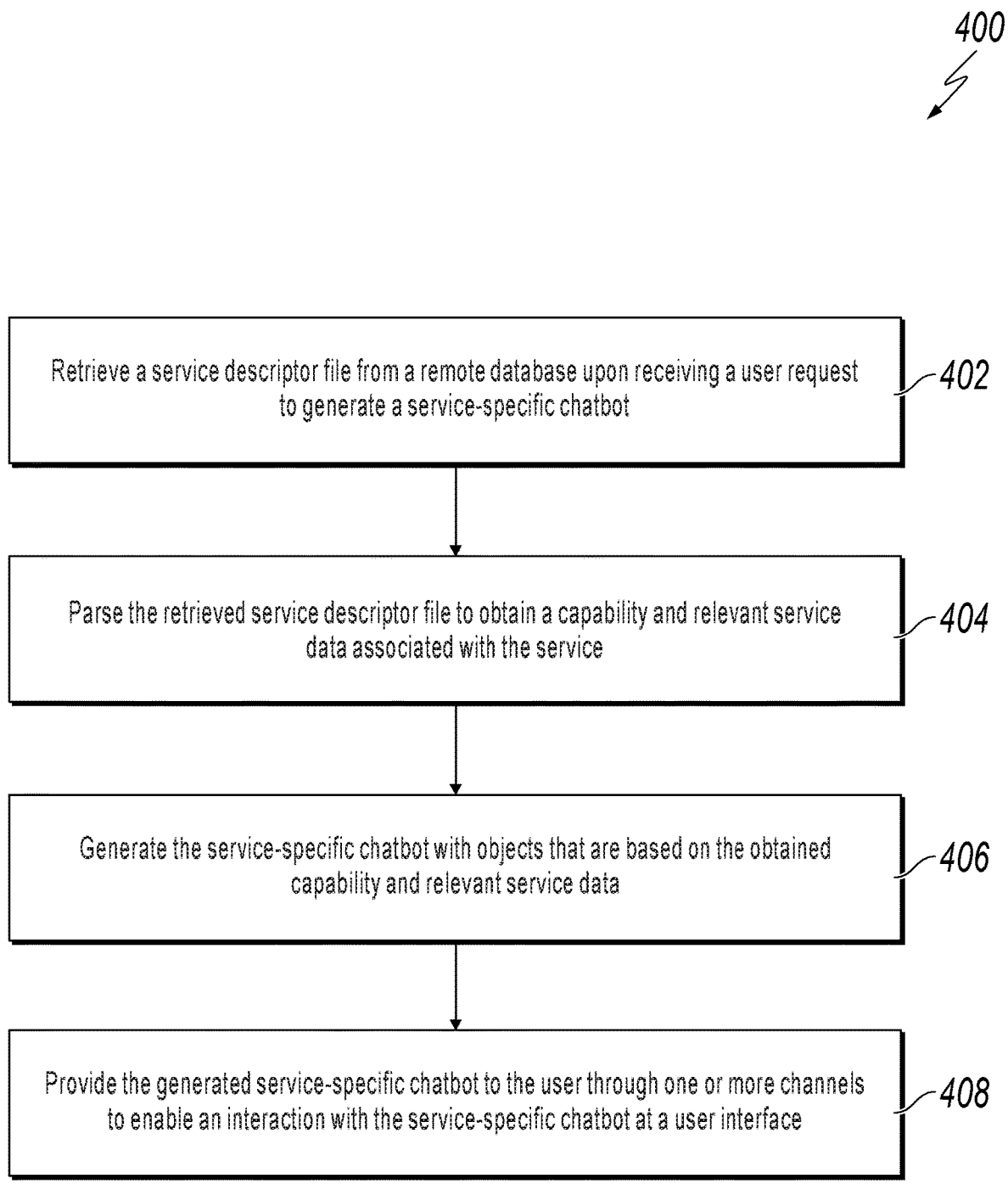
FIG. 4 is a flowchart illustrating an example of a computer-implemented method for automatically generating a service-specific chatbot and providing the generated chatbot to a user, according to an implementation of the present disclosure.

FIG. 4 is a flowchart illustrating an example of a computer-implemented method 400 for automatically generating a service-specific chatbot and providing the generated chatbot to a user, according to an implementation of the present disclosure. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

At 402, a service descriptor file is retrieved from a remote database by a server. The service described in the service descriptor file corresponds to a service-specific chatbot requested by a user. In some implementations, the service descriptor file includes at least one programming language and information for generating the service-specific chatbot. From 402, method 400 proceeds to 404.

At 404, the retrieved service descriptor file is parsed to obtain a capability and relevant service data associated with the service. From 404, method 400 proceeds to 406.

At 406, the service-specific chatbot is generated with objects based on the obtained capability and relevant service data. In some implementation, the service-specific chatbot is generated using objects such as intents, expressions, and skills that correspond to the service. In some implementations, each skill can include triggers, requirements, and actions. In some implementations, whether to activate each skill is determined based on conditions defined in the triggers. The requirements determine information that the service-specific chatbot is required to retrieve from a user and a method to retrieve the information. The actions are performed by the service-specific chatbot when the requirements are satisfied.

In some implementations, the generated service-specific chatbot can be stored in a cloud-computing environment or a remote repository. From 406, method 400 proceeds to 408.

At 408, the generated service-specific chatbot is provided to the user through one or more channels to enable interaction with the service-specific chatbot. In some implementations, the one or more channels comprise chat-type platforms executing in web browsers or on mobile devices. For example, the channels can be various messaging channels that are able to interact with the generated service-specific chatbot (such as, SKYPE, or WHATSAPP). After 408, method 400 can stop.

Figure 5:
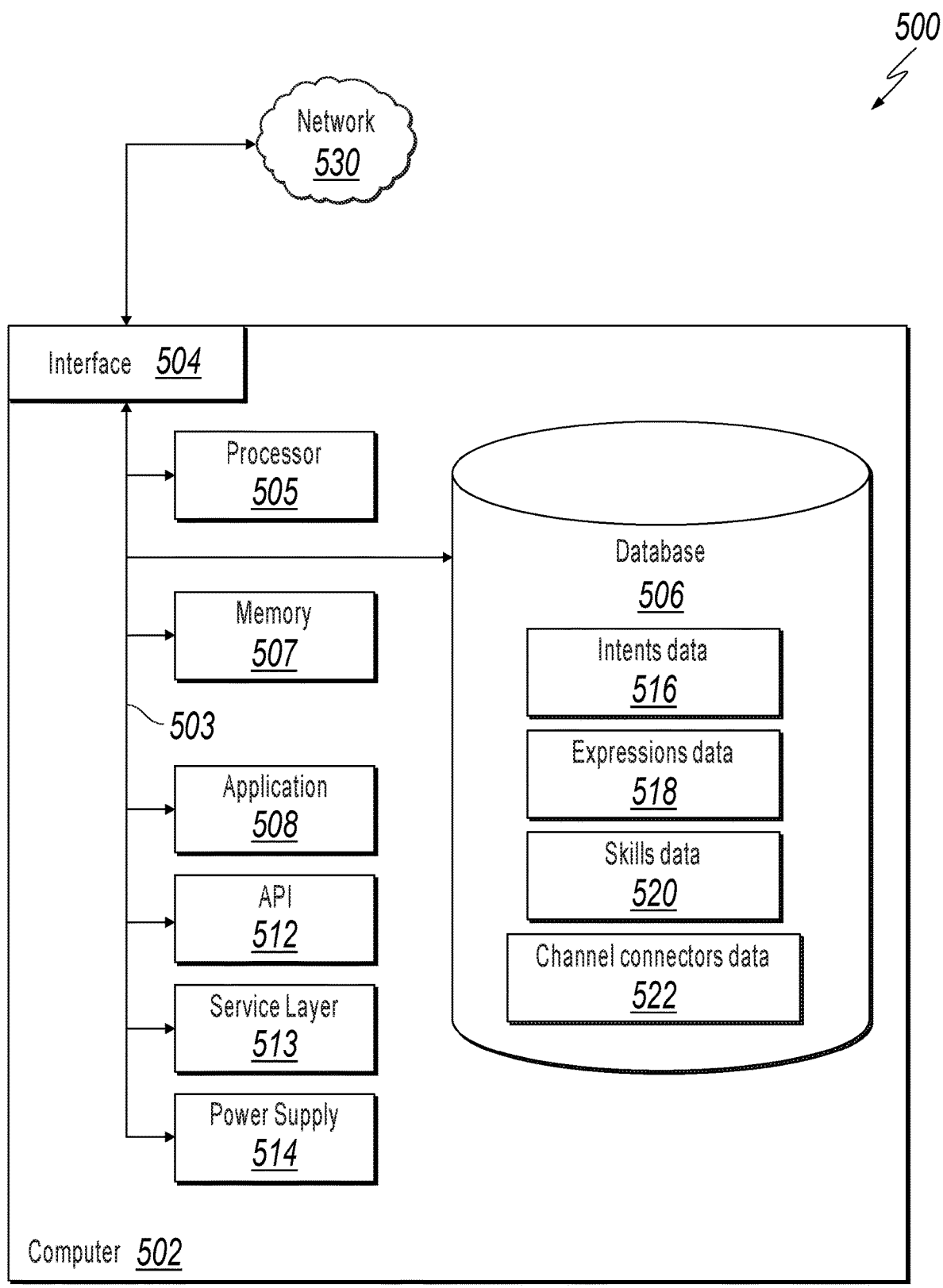
FIG. 5 is a block diagram illustrating an example of a computer-implemented system used to provide computational functionalities associated with described algorithms, methods, functions, processes, flows, and procedures, according to an implementation of the present disclosure.

FIG. 5 is a block diagram illustrating an example of a computer-implemented System 500 used to provide computational functionalities associated with described algorithms, methods, functions, processes, flows, and procedures, according to an implementation of the present disclosure. In the illustrated implementation, System 500 includes a Computer 502 and a Network 530.

The illustrated Computer 502 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 502 can include an input device, such as a keypad, keyboard, or touch screen, or a combination of input devices that can accept user information, and an output device that conveys information associated with the operation of the Computer 502, including digital data, visual, audio, another type of information, or a combination of types of information, on a graphical-type user interface (UI) (or GUI) or other UI.

The Computer 502 can serve in a role in a distributed computing system as, for example, a client, network component, a server, or a database or another persistency, or a combination of roles for performing the subject matter described in the present disclosure. The illustrated Computer 502 is communicably coupled with a Network 530. In some implementations, one or more components of the Computer 502 can be configured to operate within an environment, or a combination of environments, including cloud computing, local, or global.

At a high level, the Computer 502 is an electronic computing device operable to receive, transmit, process, store, or manage data and information associated with the described subject matter. According to some implementations, the Computer 502 can also include or be communicably coupled with a server, such as an application server, e-mail server, web server, caching server, or streaming data server, or a combination of servers.

The Computer 502 can receive requests over Network 530 (for example, from a client software application executing on another Computer 502) and respond to the received requests by processing the received requests using a software application or a combination of software applications. In addition, requests can also be sent to the Computer 502 from internal users (for example, from a command console or by another internal access method), external or third-parties, or other entities, individuals, systems, or computers.

Each of the components of the Computer 502 can communicate using a System Bus 503. In some implementations, any or all of the components of the Computer 502, including hardware, software, or a combination of hardware and software, can interface over the System Bus 503 using an application programming interface (API) 512, a Service Layer 513, or a combination of the API 512 and Service Layer 513. The API 512 can include specifications for routines, data structures, and object classes. The API 512 can be either computer-language independent or dependent and refer to a complete interface, a single function, or even a set of APIs. The Service Layer 513 provides software services to the Computer 502 or other components (whether illustrated or not) that are communicably coupled to the Computer 502. The functionality of the Computer 502 can be accessible for all service consumers using the Service Layer 513. Software services, such as those provided by the Service Layer 513, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 502, alternative implementations can illustrate the API 512 or the Service Layer 513 as stand-alone components in relation to other components of the Computer 502 or other components (whether illustrated or not) that are communicably coupled to the Computer 502. Moreover, any or all parts of the API 512 or the Service Layer 513 can be implemented as a child or a sub-module of another software module, enterprise application, or hardware module without departing from the scope of the present disclosure.

The Computer 502 includes an Interface 504. Although illustrated as a single Interface 504, two or more Interfaces 504 can be used according to particular needs, desires, or particular implementations of the Computer 502. The Interface 504 is used by the Computer 502 for communicating with another computing system (whether illustrated or not) that is communicatively linked to the Network 530 in a distributed environment. Generally, the Interface 504 is operable to communicate with the Network 530 and includes logic encoded in software, hardware, or a combination of software and hardware. More specifically, the Interface 504 can include software supporting one or more communication protocols associated with communications such that the Network 530 or hardware of Interface 504 is operable to communicate physical signals within and outside of the illustrated Computer 502.

The Computer 502 includes a Processor 505. Although illustrated as a single Processor 505, two or more Processors 505 can be used according to particular needs, desires, or particular implementations of the Computer 502. Generally, the Processor 505 executes instructions and manipulates data to perform the operations of the Computer 502 and any algorithms, methods, functions, processes, flows, and procedures as described in the present disclosure.

The Computer 502 also includes a Database 506 that can hold data for the Computer 502, another component communicatively linked to the Network 530 (whether illustrated or not), or a combination of the Computer 502 and another component. For example, Database 506 can be an in-memory or conventional database storing data consistent with the present disclosure. In some implementations, Database 506 can be a combination of two or more different database types (for example, a hybrid in-memory and conventional database) according to particular needs, desires, or particular implementations of the Computer 502 and the described functionality. Although illustrated as a single Database 506, two or more databases of similar or differing types can be used according to particular needs, desires, or particular implementations of the Computer 502 and the described functionality. While Database 506 is illustrated as an integral component of the Computer 502, in alternative implementations, Database 506 can be external to the Computer 502. As illustrated, the Database 506 holds the previously described data for entities such as intents data 516, expressions data 518, skills data 520, and channel connectors data 522.

The Computer 502 also includes a Memory 507 that can hold data for the Computer 502, another component or components communicatively linked to the Network 530 (whether illustrated or not), or a combination of the Computer 502 and another component. Memory 507 can store any data consistent with the present disclosure. In some implementations, Memory 507 can be a combination of two or more different types of memory (for example, a combination of semiconductor and magnetic storage) according to particular needs, desires, or particular implementations of the Computer 502 and the described functionality. Although illustrated as a single Memory 507, two or more Memories 507 or similar or differing types can be used according to particular needs, desires, or particular implementations of the Computer 502 and the described functionality. While Memory 507 is illustrated as an integral component of the Computer 502, in alternative implementations, Memory 507 can be external to the Computer 502.

The Application 508 is an algorithmic software engine providing functionality according to particular needs, desires, or particular implementations of the Computer 502, particularly with respect to functionality described in the present disclosure. For example, Application 508 can serve as one or more components, modules, or applications. Further, although illustrated as a single Application 508, the Application 508 can be implemented as multiple Applications 508 on the Computer 502. In addition, although illustrated as integral to the Computer 502, in alternative implementations, the Application 508 can be external to the Computer 502.

The Computer 502 can also include a Power Supply 514. The Power Supply 514 can include a rechargeable or non-rechargeable battery that can be configured to be either user- or non-user-replaceable. In some implementations, the Power Supply 514 can include power-conversion or management circuits (including recharging, standby, or another power management functionality). In some implementations, the Power Supply 514 can include a power plug to allow the Computer 502 to be plugged into a wall socket or another power source to, for example, power the Computer 502 or recharge a rechargeable battery.

There can be any number of Computers 502 associated with, or external to, a computer system containing Computer 502, each Computer 502 communicating over Network 530. Further, the term "client," "user," or other appropriate terminology can be used interchangeably, as appropriate, without departing from the scope of the present disclosure. Moreover, the present disclosure contemplates that many users can use one Computer 502, or that one user can use multiple computers 502.

Described implementations of the subject matter can include one or more features, alone or in combination.

For example, in a first implementation, a computer-implemented method, comprising: retrieving, by a server, a service descriptor file from a remote database, wherein a service described in the service descriptor file corresponds to a service-specific chatbot requested by a user; parsing the received service descriptor to obtain a capability and relevant service data associated with the service; generating the service-specific chatbot with at least one object that is based on the obtained capability and relevant service data, wherein the at least one object includes intents, expressions, and skills that correspond to the service; and providing the generated service-specific chatbot to the user through at least one channel to enable an interaction with the service-specific chatbot with a graphical user interface.

The foregoing and other described implementations can each, optionally, include one or more of the following features:

A first feature, combinable with any of the following features, wherein the service descriptor file is comprised of at least one programming language and includes information for generating the service-specific chatbot.

A second feature, combinable with any of the previous or following features, wherein generating a service-specific chatbot comprises: for each capability described in the service descriptor file, generating an intent for the service-specific chatbot; for each generated intent, generating at least one expression according to descriptions of the capability included in the service descriptor file; for each generated intent, creating a skill, wherein the skill includes an action and corresponding data that is extracted from the service descriptor file; and generating a service-specific chatbot based on the intent, the at least one expression, and skills.

A third feature, combinable with any of the previous or following features, wherein the generated chatbot is stored in a cloud-computing environment.

A fourth feature, combinable with any of the previous or following features, wherein the skill comprises: at least one trigger, wherein whether to activate the skill is determined based on at least one condition defined in the at least one trigger; at least one requirement that determines information the service-specific chatbot is required to retrieve from a user and a method to retrieve the information; and at least one action that is performed by the service-specific chatbot when the at least one requirement is satisfied.

A fifth feature, combinable with any of the previous or following features, wherein the at least one channel comprises chat platforms executing in web browsers or on mobile computing devices.

A sixth feature, combinable with any of the previous or following features, wherein the service-dedicated chatbot can automatically adapt to a change of a service.

In a second implementation, a non-transitory, computer-readable medium storing one or more instructions executable by a computer system to perform operations comprising: retrieving, by a server, a service descriptor file from a remote database, wherein a service described in the service descriptor file corresponds to a service-specific chatbot requested by a user; parsing the received service descriptor to obtain a capability and relevant service data associated with the service; generating the service-specific chatbot with at least one object that is based on the obtained capability and relevant service data, wherein the at least one object includes intents, expressions, and skills that correspond to the service; and providing the generated service-specific chatbot to the user through at least one channel to enable an interaction with the service-specific chatbot with a graphical user interface.

The foregoing and other described implementations can each, optionally, include one or more of the following features:

A first feature, combinable with any of the following features, wherein the service descriptor file is comprised of at least one programming language and includes information for generating the service-specific chatbot.

A second feature, combinable with any of the previous or following features, wherein generating a service-specific chatbot comprises: for each capability described in the service descriptor file, generating an intent for the service-specific chatbot; for each generated intent, generating at least one expression according to descriptions of the capability included in the service descriptor file; for each generated intent, creating a skill, wherein the skill includes an action and corresponding data that is extracted from the service descriptor file; and generating a service-specific chatbot based on the intent, the at least one expression, and skills.

A third feature, combinable with any of the previous or following features, wherein the generated chatbot is stored in a cloud-computing environment.

A fourth feature, combinable with any of the previous or following features, wherein the skill comprises: at least one trigger, wherein whether to activate the skill is determined based on at least one condition defined in the at least one trigger; at least one requirement that determines information the service-specific chatbot is required to retrieve from a user and a method to retrieve the information; and at least one action that is performed by the service-specific chatbot when the at least one requirement is satisfied.

A fifth feature, combinable with any of the previous or following features, wherein the at least one channel comprises chat platforms executing in web browsers or on mobile computing devices.

A sixth feature, combinable with any of the previous or following features, wherein the service-dedicated chatbot can automatically adapt to a change of a service.

In a third implementation, a computer-implemented system, comprising, one or more computers; and one or more computer memory devices interoperably coupled with the one or more computers and having tangible, non-transitory, machine-readable media storing one or more instructions that, when executed by the one or more computers, perform one or more operations comprising: retrieving, by a server, a service descriptor file from a remote database, wherein a service described in the service descriptor file corresponds to a service-specific chatbot requested by a user; parsing the received service descriptor to obtain a capability and relevant service data associated with the service; generating the service-specific chatbot with at least one object that is based on the obtained capability and relevant service data, wherein the at least one object includes intents, expressions, and skills that correspond to the service; and providing the generated service-specific chatbot to the user through at least one channel to enable an interaction with the service-specific chatbot with a graphical user interface.

The foregoing and other described implementations can each, optionally, include one or more of the following features:

A first feature, combinable with any of the following features, wherein the service descriptor file is comprised of at least one programming language and includes information for generating the service-specific chatbot.

A second feature, combinable with any of the previous or following features, wherein generating a service-specific chatbot comprises: for each capability described in the service descriptor file, generating an intent for the service-specific chatbot; for each generated intent, generating at least one expression according to descriptions of the capability included in the service descriptor file; for each generated intent, creating a skill, wherein the skill includes an action and corresponding data that is extracted from the service descriptor file; and generating a service-specific chatbot based on the intent, the at least one expression, and skills.

A third feature, combinable with any of the previous or following features, wherein the generated chatbot is stored in a cloud-computing environment.

A fourth feature, combinable with any of the previous or following features, wherein the skill comprises: at least one trigger, wherein whether to activate the skill is determined based on at least one condition defined in the at least one trigger; at least one requirement that determines information the service-specific chatbot is required to retrieve from a user and a method to retrieve the information; and at least one action that is performed by the service-specific chatbot when the at least one requirement is satisfied.

A fifth feature, combinable with any of the previous or following features, wherein the at least one channel comprises chat platforms executing in web browsers or on mobile computing devices.

A sixth feature, combinable with any of the previous or following features, wherein the service-dedicated chatbot can automatically adapt to a change of a service.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving a user input comprising a request to generate a service-specific chatbot on a chatbot development platform;
   retrieving, by the chatbot development platform, a service descriptor file and a service metadata descriptor file associated with the service descriptor file from a remote database by using a service root uniform resource identifier of the service descriptor file, wherein the service descriptor file lists top-level data feeds that correspond to the service-specific chatbot requested by a user and the service descriptor file comprises a service that corresponds to the service-specific chatbot requested by the user and addresses of the top-level data feeds;
   parsing the service descriptor file to obtain a capability and relevant service data associated with the service, wherein the capability comprises a query associated with the service and wherein the relevant service data comprises a vocabulary object in a corresponding data structure;
   parsing the service metadata descriptor file to extract metadata information;
   generating a service-specific language by mapping the metadata information extracted from the service metadata descriptor file to the vocabulary object extracted from the service descriptor file;
   generating the service-specific chatbot with at least one object that is based on the capability and the service-specific language, wherein the at least one object comprises intents, expressions, and skills that correspond to the service, wherein the intents define contexts of the service, the expressions are organized in intents and constitute a knowledge of the service-specific chatbot, and the skills comprise conversational blocks executable to achieve a goal; and
   providing the service-specific chatbot to the user through at least one channel to enable an interaction with the service-specific chatbot with a graphical user interface.

2. The computer-implemented method of claim 1, wherein the service descriptor file is comprised of at least one programming language and comprises information for generating the service-specific chatbot.

3. The computer-implemented method of claim 1, wherein generating the service-specific chatbot comprises:
   for each capability described in the service descriptor file, generating an intent for the service-specific chatbot;

for each generated intent, generating at least one expression according to descriptions of the capability included in the service descriptor file;

for each generated intent, creating a skill, wherein the skill comprises an action and corresponding data that is extracted from the service descriptor file; and generating a service-specific chatbot based on the intent, the at least one expression, and the skill.

4. The computer-implemented method of claim 1, wherein the service-specific chatbot is stored in a cloud-computing environment.

5. The computer-implemented method of claim 1, wherein the skills comprise:

at least one trigger, wherein whether to activate the skill is determined based on at least one condition defined in the at least one trigger;

at least one requirement that determines information the service-specific chatbot is required to retrieve from the user and a method to retrieve the information; and at least one action that is performed by the service-specific chatbot when the at least one requirement is satisfied.

6. The computer-implemented method of claim 1, wherein the at least one channel comprises chat platforms executing in web browsers or on mobile computing devices.

7. The computer-implemented method of claim 1, wherein the service-specific chatbot can automatically adapt to a change of the service.

8. A non-transitory, computer-readable medium storing one or more instructions executable by a computer system to perform operations comprising:

receiving a user input comprising a request to generate a service-specific chatbot on a chatbot development platform;

retrieving, by the chatbot development platform, a service descriptor file and a service metadata descriptor file associated with the service descriptor file from a remote database by using a service root uniform resource identifier of the service descriptor file, wherein the service descriptor file lists top-level data feeds that correspond to the service-specific chatbot requested by a user and the service descriptor file comprises a service that corresponds to the service-specific chatbot requested by the user and addresses of the top-level data feeds;

parsing the service descriptor file to obtain a capability and relevant service data associated with the service, wherein the capability comprises a query associated with the service and wherein the relevant service data comprises a vocabulary object in a corresponding data structure;

parsing the service metadata descriptor file to extract metadata information;

generating a service-specific language by mapping the metadata information extracted from the service metadata descriptor file to the vocabulary object extracted from the service descriptor file;

generating the service-specific chatbot with at least one object that is based on the capability and the service-specific language, wherein the at least one object comprises intents, expressions, and skills that correspond to the service, wherein the intents define contexts of the service, the expressions are organized in intents and constitute a knowledge of the service-specific chatbot, and the skills comprise conversational blocks executable to achieve a goal; and providing the service-specific chatbot to the user through at least one channel to enable an interaction with the service-specific chatbot with a graphical user interface.

9. The non-transitory, computer-readable medium of claim 8, wherein the service descriptor file is comprised of at least one programming language and comprises information for generating the service-specific chatbot.

10. The non-transitory, computer-readable medium of claim 8, wherein generating the service-specific chatbot comprises one or more instructions to:

for each capability described in the service descriptor file, generate an intent for the service-specific chatbot;

for each generated intent, generate at least one expression according to descriptions of the capability included in the service descriptor file;

for each generated intent, create a skill, wherein the skill comprises an action and corresponding data that is extracted from the service descriptor file; and generate a service-specific chatbot based on the intent, the at least one expression, and the skill.

11. The non-transitory, computer-readable medium of claim 8, wherein the service-specific chatbot is stored in a cloud-computing environment.

12. The non-transitory, computer-readable medium of claim 8, wherein the wherein the skills comprise:

at least one trigger, wherein whether to activate the skill is determined based on at least one condition defined in the at least one trigger;

at least one requirement that determines information the service-specific chatbot is required to retrieve from the user and a method to retrieve the information; and at least one action that is performed by the service-specific chatbot when the at least one requirement is satisfied.

13. The non-transitory, computer-readable medium of claim 8, wherein the at least one channel comprises chat platforms executing in web browsers or on mobile computing devices.

14. The non-transitory, computer-readable medium of claim 8, wherein the service-specific chatbot can automatically adapt to a change of the service.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving a user input comprising a request to generate a service-specific chatbot on a chatbot development platform;

retrieving, by the chatbot development platform, a service descriptor file and a service metadata descriptor file associated with the service descriptor file from a remote database by using a service root uniform resource identifier of the service descriptor file, wherein the service descriptor file lists top-level data feeds that correspond to the service-specific chatbot requested by a user and the service descriptor file comprises a service that corresponds to the service-specific chatbot requested by the user and addresses of the top-level data feeds;

parsing the service descriptor file to obtain a capability and relevant service data associated with the service, wherein the capability comprises a query associated with the service and wherein the relevant service data comprises a vocabulary object in a corresponding data structure;

parsing the service metadata descriptor file to extract metadata information;

generating a service-specific language by mapping the metadata information extracted from the service metadata descriptor file to the vocabulary object extracted from the service descriptor file;

generating the service-specific chatbot with at least one object that is based on the capability and the service-specific language, wherein the at least one object comprises intents, expressions, and skills that correspond to the service, wherein the intents define contexts of the service, the expressions are organized in intents and constitute a knowledge of the service-specific chatbot, and the skills comprise conversational blocks executable to achieve a goal; and providing the service-specific chatbot to the user through at least one channel to enable an interaction with the service-specific chatbot with a graphical user interface.

16. The computer-implemented system of claim 15, wherein generating the service-specific chatbot comprises one or more operations to:

for each capability described in the service descriptor file, generate an intent for the service-specific chatbot;

for each generated intent, generate at least one expression according to descriptions of the capability included in the service descriptor file;

for each generated intent, create a skill, wherein the skill comprises an action and corresponding data that is extracted from the service descriptor file; and generate a service-specific chatbot based on the intent, the at least one expression, and the skill.

17. The computer-implemented system of claim 15, wherein the service-specific chatbot is stored in a cloud-computing environment.

18. The computer-implemented system of claim 15, wherein the wherein the skills comprise:

at least one trigger, wherein whether to activate the skill is determined based on at least one condition defined in the at least one trigger;

at least one requirement that determines information the service-specific chatbot is required to retrieve from the user and a method to retrieve the information; and at least one action that is performed by the service-specific chatbot when the at least one requirement is satisfied.

19. The computer-implemented system of claim 15, wherein the at least one channel comprises chat platforms executing in web browsers or on mobile computing devices.

20. The computer-implemented system of claim 15, wherein the service-specific chatbot can automatically adapt to a change of the service.

* * * * *